United States Patent

[11] 3,599,906

| [72] | Inventor | George Horst Reinemuth<br>Secane, Pa. |
|---|---|---|
| [21] | Appl. No. | 845,730 |
| [22] | Filed | July 29, 1969 |
| [45] | Patented | Aug. 17, 1971 |
| [73] | Assignee | Gulf & Western Industrial Products<br>Company<br>Grand Rapids, Mich. |

[54] ADJUSTABLE ROTARY HYDRAULIC BRAKE
11 Claims, 5 Drawing Figs.

[52] U.S. Cl. .................................................. 244/110,
188/290
[51] Int. Cl. ..................................................... B64f 1/02
[50] Field of Search........................................... 244/110,
63; 188/90, 90 A, 90 V, 290, 296, 293, 294

[56] References Cited
UNITED STATES PATENTS
2,324,074  7/1943  Gerber ......................... 188/90

| 2,419,372 | 4/1947 | Schneider..................... | 188/90 |
| 2,967,683 | 1/1961 | Crater .......................... | 180/90 X |
| 3,371,890 | 3/1968 | Merle ............................ | 244/110 |
| 2,790,519 | 4/1957 | Crankshaw.................... | 188/90 |

FOREIGN PATENTS

| 527,087 | 5/1955 | Italy ............................. | 188/90 |

*Primary Examiner*—Milton Buchler
*Assistant Examiner*—Paul E. Sauberer
*Attorney*—Meyer, Tilberry and Body ABSTRACT: A rotary hydraulic brake includes a rotor having vanes. The vanes are adjustable radially outward to increase their effective length. An adjustment means is provided to position the rotor vanes at a desirable length and vary the retarding torque produced by the absorber. A programming device may be included for progressively increasing the effective length of the rotor vanes during rotation of the rotor.

PATENTED AUG 17 1971
3,599,906
SHEET 1 OF 3
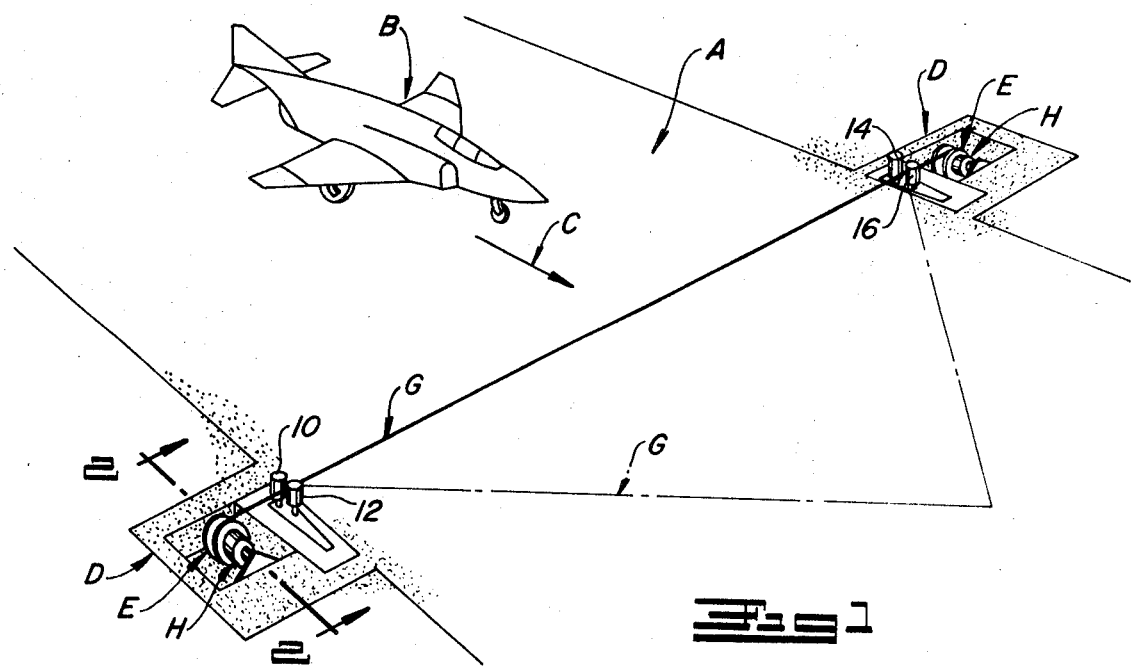
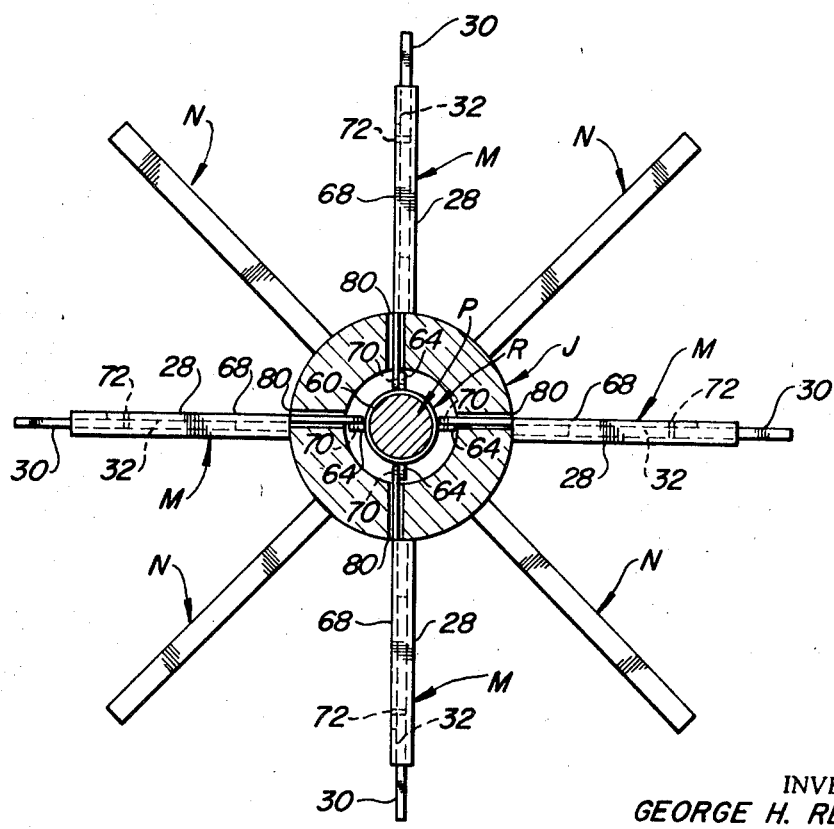
INVENTOR.
GEORGE H. REINEMUTH
BY
Meyer, Tillery & Body
ATTORNEYS

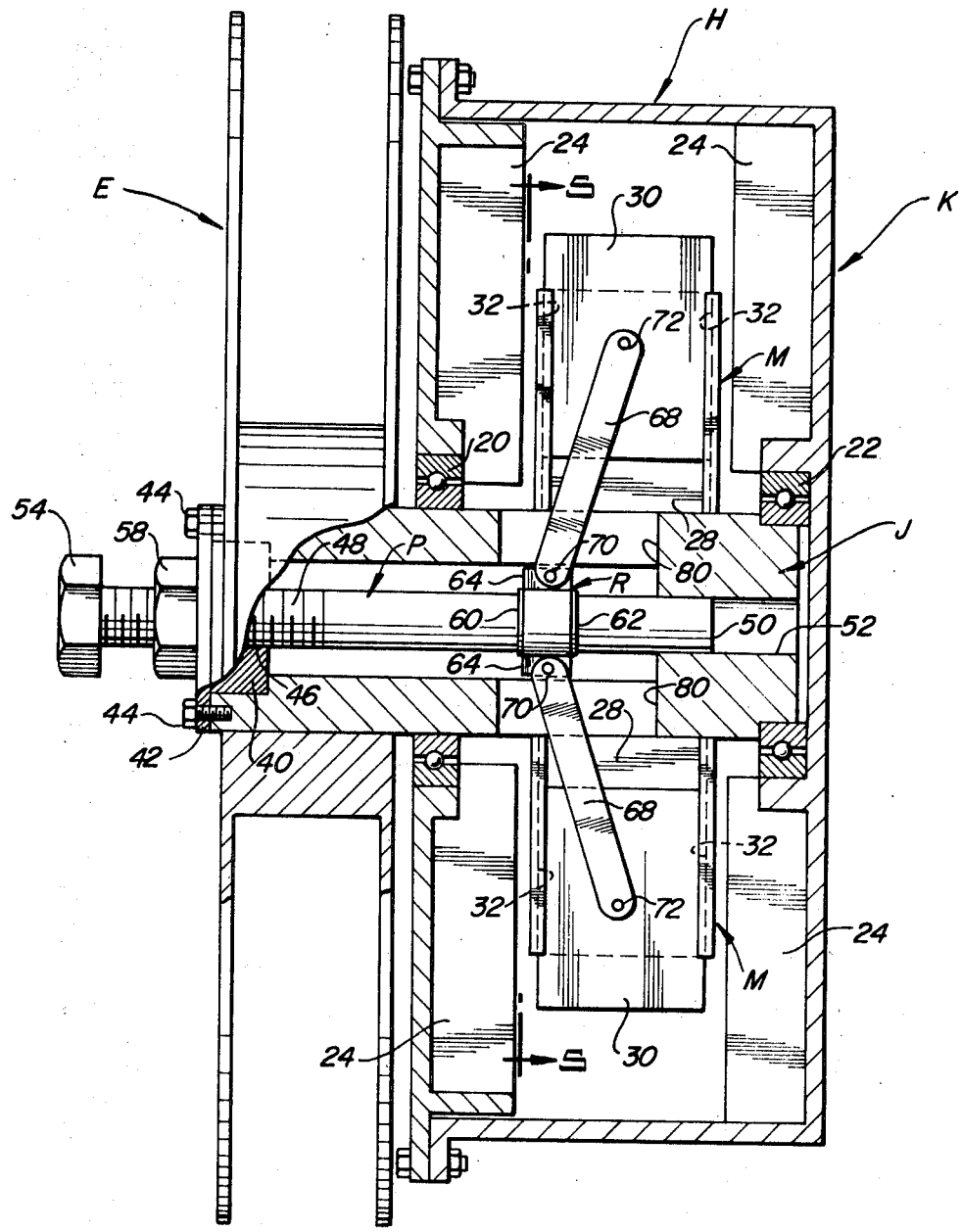

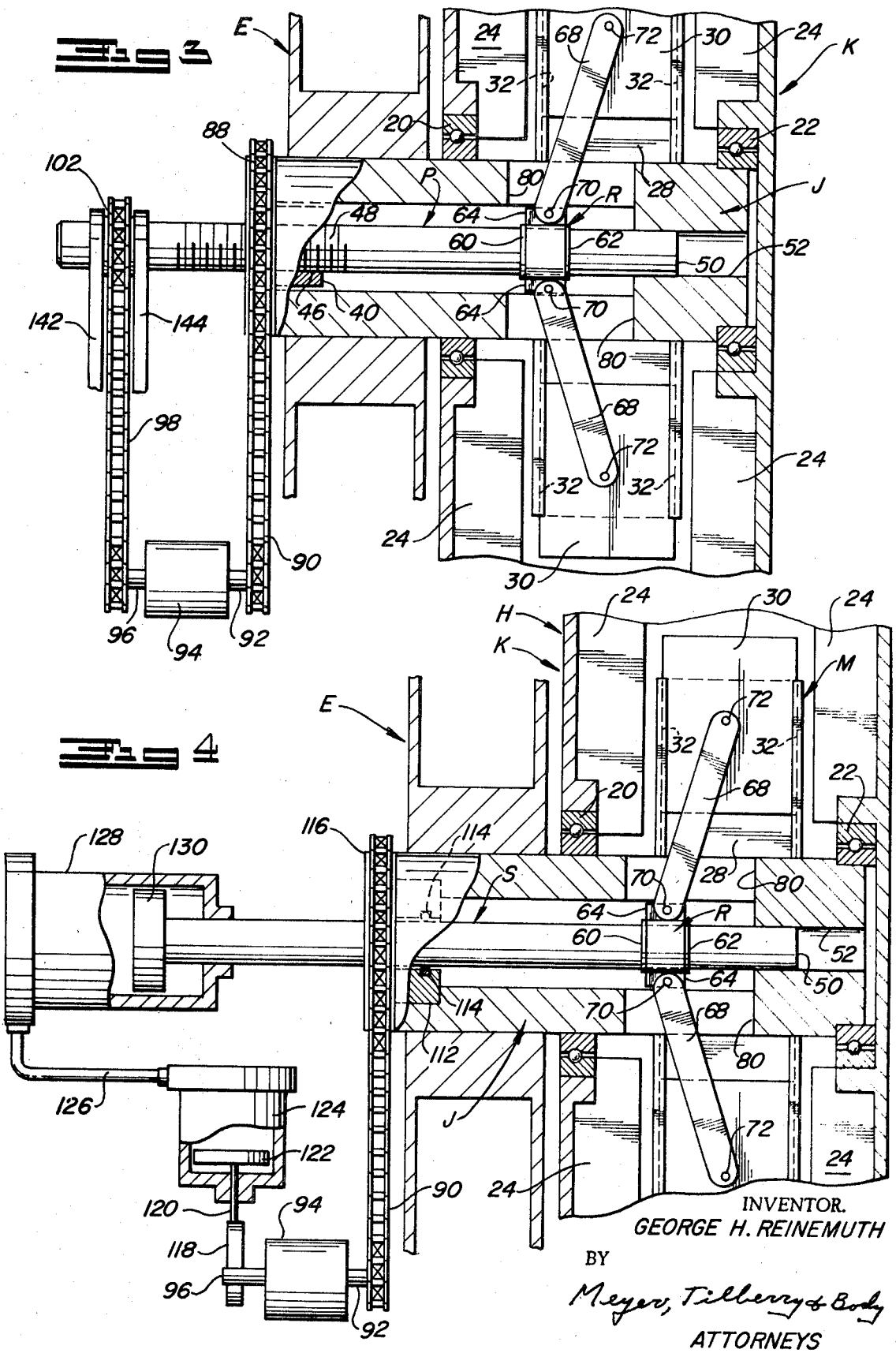

3,599,906

ADJUSTABLE ROTARY HYDRAULIC BRAKE

BACKGROUND OF THE INVENTION

This application pertains to the art of rotary hydraulic energy absorbers and more particularly to an adjustable rotary hydraulic energy absorber. The invention is particularly applicable to aircraft-arresting apparatus and will be described with particular reference thereto although it will be appreciated that the invention has broader applications and can be used in other environments than with aircraft-arresting apparatus.

Aircraft-arresting apparatus is commonly provided with a rotatable reel having an elongated payout device coiled thereon. A landing aircraft engages the payout device to uncoil it from the reel and causes rotation of the reel. An energy absorber connected with the reel retards rotation of the reel to provide a retarding force which quickly brings the aircraft to a stop. Many prior devices have used energy absorbers of the rotary hydraulic type. One such device is disclosed in U.S. Pat. No. 3,142,458 to Byrne et al. During arrestment of an aircraft, the aircraft decelerates and this brings about a corresponding deceleration of the reel. In view of the fact that rotary hydraulic brakes are commonly driven by rotation of the reel, deceleration of the reel causes deceleration of the rotary hydraulic energy absorber. As the energy absorber slows down, its retarding torque constantly decreases. With such arrangements, it is not possible to bring an aircraft to a stop at a substantially constant deceleration rate. In many prior devices, various cams and valve devices have been utilized to vary the amount of liquid available for the rotary hydraulic energy absorber. With such arrangements, more liquid is supplied to the energy absorber as it slows down so that the retarding torque provided remains substantially constant. However, varying the amount of liquid in the energy absorber does not provide an accurate control of the retarding torque produced. The retarding torque provided by a rotary hydraulic energy absorber is equal to a K factor times the square of the r.p.m. Therefore, the retarding torque falls off with the square of the r.p.m. and a reduction in speed of the reel causes such a large reduction in available braking torque that it is difficult to maintain the braking torque constant simply by providing additional liquid to the absorber. Prior rotary hydraulic energy absorbers are also adjustable to predetermined weight settings for smoothly bringing different weights of aircraft to a stop over a predetermined distance. For example, it may be desirable to arrest an extremely large aircraft and a much smaller aircraft weighing only half as much as the large aircraft over the same runout distance. If a brake is set to provide retarding torque at such a rate that it would arrest a large aircraft over the predetermined distance, such retarding torque would stop a much smaller aircraft in one-half the distance. This would produce a very high deceleration rate for small aircraft which might damage its structure and will also cause discomfort to human occupants of the aircraft. Therefore, such energy absorbers are commonly adjustable to provide a reduction in available retarding torque when arresting lighter loads.

It would be desirable to have a rotary hydraulic energy absorber which was adjustable in order to provide varying degrees of retarding torque.

SUMMARY OF THE INVENTION

In accordance with the present invention, a rotary hydraulic brake includes a rotor on which vanes are mounted. An adjusting device is provided for varying the effective length of the rotor vanes in order to vary the retarding torque produced by the absorber. As is well known, the retarding torque provided by a rotary hydraulic energy absorber is equal to a constant times the square of the r.p.m. The horsepower produced by a rotary hydraulic brake is also often expressed as being proportional to the diameter of the rotor vanes to the fifth power times the cube of the angular velocity times the density of the liquid used. Therefore, the retarding torque provided by a rotary hydraulic energy absorber is proportional to the fifth power of the diameter of the rotor vanes. In accordance with the present invention, a very small change in the effective length of the rotor vanes provides a very large increase in available retarding torque. Therefore, as rotation of the energy absorber slows down it is possible to maintain a very high retarding torque by increasing the effective length of the rotor vanes.

In accordance with the invention, the rotor of the hydraulic energy absorber has vanes attached thereto and the vanes are formed in at least two parts. One vane part is fixed to the hub of the rotor and the other vane part is movably attached to the fixed vane part. An adjusting device is provided in the hub of the rotor for moving the movable part of the vane radially outward in order to increase the effective length of the vanes.

In one arrangement, an operating device is provided for moving the adjusting device progressively during rotation of the rotor so that the retarding torque produced will remain substantially constant even though rotor r.p.m. is decreasing. With such an arrangement, it is possible to bring an aircraft to a stop with a very smooth deceleration rate.

It is a principal object of the present invention to provide a rotary hydraulic energy absorber with an adjusting device for varying the effective length of the rotor vanes.

It is also an object of the present invention to provide such an energy absorber with an operating device for automatically increasing the effective length of the rotor vanes during rotation of the rotor.

It is a further object of the present invention to provide an aircraft arresting apparatus with such an energy absorber so that aircraft of many different weights may be smoothly decelerated over substantially the same distance.

BRIEF DESCRIPTION OF THE DRAWING

The invention may take physical form in certain parts and arrangements of parts, a preferred embodiment of which will be described in detail in this specification and illustrated in the accompanying drawings which form a part hereof.

FIG. 1 is a diagrammatic illustration of an arresting apparatus having the improved hydraulic energy absorber of the present invention incorporated therein;

FIG. 2 is a cross section view looking in the direction of arrows 2-2 of FIG. 1;

FIG. 3 is an enlarged cross section view looking in the same direction as FIG. 2 and showing one arrangement for automatically increasing the effective length of rotor vanes as the rotor rotates;

FIG. 4 is a cross sectional view looking in the same direction as FIGS. 2 and 3 and showing another arrangement for progressively increasing the effective length of the rotor vanes as the rotor rotates; and FIG. 5 is a cross-sectional view looking in the direction of arrows 5-5 of FIG. 2.

DESCRIPTION OF THE PREFERRED EMBODIMENTS

Referring now to the drawings, wherein the showings are for purposes of illustrating the preferred embodiments of the invention only and not for purposes of limiting same, FIG. 1 shows an aircraft runway A on which an aircraft B lands and moves in the direction of arrow C. Energy absorbers D installed at opposite sides of runway A include rotatable reels E having a cable or tape G coiled thereon. Cable G extends transversely of runway A through guide sheaves 10, 12, 14 and 16. Each reel E is drivingly connected with an energy absorber H for retarding rotation of reels E. Aircraft B lands on runway A and moves in the direction of arrow C to engage cable G which is stretched transversely across runway A. This places tension in cable G which causes it to move to the shadow line position shown in FIG. 1. Cable G then uncoils from reels E and causes reels E to rotate. Energy absorbers H retard rotation of reels E to apply a braking force to aircraft B through cable G and decelerate aircraft B.

Reel E is adapted to have a cable or an elongated flat woven tape coiled thereon of the type disclosed in the aforementioned Byrne patent. With reference to FIG. 2, reel E is mounted on a hub J which is rotatably journaled in bearings 20 and 22 of housing K for energy absorber H. Housing K is fixed against rotation. Housing K is adapted to receive liquid through suitable conduits in a well-known manner such as described in the aforementioned Byrne patent. Housing K includes vanes 24 which are circumferentially spaced to define stator pockets. Hub J has circumferentially spaced adjustable vanes M attached thereto and extending radially outward therefrom. Adjustable vanes M include a fixed vane part 28 which is secured to hub J as by welding, and a movable vane part 30 which is movably attached to fixed vane part 28. Although all of the vanes attached to rotor J may be adjustable, an arrangement will be described in which a plurality of nonadjustable vanes N are also secured to rotor J as by welding. In the arrangement shown, there are four adjustable vanes M which are equidistantly spaced apart around the circumference of hub J and four fixed vanes N which are equidistantly spaced circumferentially around hub J. In any arrangement, it is desirable to have a symmetrical relationship so that the rotor will be balanced in any adjusted position of adjustable vanes M.

Fixed vane portions 28 of adjustable vanes M have their radial side edges reversely folded to provide channels 32 in which the side edges of movable vanes 30 are slidably received. It will be recognized that many other ways of slidably attaching movable vane portion 30 to fixed vane portion 28 may be devised. For example, a bolt or rivet having an enlarged head may be attached to fixed vane part 28 and extend through an elongated radial slot in movable vane part 30.

Hub J is hollow and is provided at one end with a threaded bushing 40 having a flange 42 through which bolts 44 extend into threaded axial bores in hub J for securing bushing 40 thereto. Threaded bushing 40 includes a threaded bore 46 which threadedly receives a threaded portion 48 of shaft P. Shaft P includes an end portion 50 slidably received in a bore 52 in the other end of hub J. Shaft P may be provided with an enlarged head 54 to which a wrench may be applied for rotating shaft P relative to bushing 40. Rotational movement of shaft P selectively in opposite directions will cause shaft P to shift axially to either the right or the left as viewed in FIG. 2, due to cooperation of threads 46 and 48. A locknut 58 is threaded onto threaded portion 48 of shaft P exteriorly of bushing 40 for locking shaft P in any selected adjusted position. For example, nut 58 may be loosened in order to rotate shaft P. Once shaft P has been moved to its desired axial position, nut 58 is tightened into contact with the exterior surface of bushing 40 to prevent further rotational movement of shaft P relative to bushing 40.

A bearing member R is received on shaft P and held in a fixed axial position on shaft P as by C-rings 60 and 62 received in circumferential grooves formed in shaft P. C-rings 60 and 62 prevent relative axial movement of bearing R on shaft P while permitting relative rotation of shaft P with respect to bearing R. Bearing R includes outwardly extending flanges 64 to which links 68 are pivotally attached as by pins 70. Links 68 extend to pivot connections provided by pins 72 on movable vane portions 30 of adjustable vanes M.

In operation, nut 58 is loosened to allow shaft P to be rotated relative to threaded bushing 40. A wrench is then applied to enlarged head 54 of shaft P to rotate shaft P clockwise and cause shaft P to move axially to the right due to cooperation of threads 46 and 48. Movement of shaft P to the right also causes movement of bearing R to the right due to its fixed axial position on shaft P by means of C-rings 60 and 62. Movement of bearing R to the right in FIG. 2 causes pivot pin 72 to move outwardly further away from pivot pin 70 on bearing R. This movement slidably shifts movable vane portions 30 radially outward from shaft J relative to fixed vane portions 28 of adjustable vanes M. When movable vane portions 30 are in their desired position, nut 58 is tightened against the outer surface of bushing 40 to lock shaft P against rotation relative to bushing 40. When an aircraft is arrested, reel E and hub J will rotate relative to fixed energy absorber housing K. Adjustable vanes M, links 58 and bearing R will also rotate with hub J. In one arrangement, links 68 may extend through radial slots 80 formed in hub J. It will be recognized that the arrangement described provides a variable retarding torque for energy absorber H by varying the effective length of adjustable vanes M.

In accordance with another arrangement, an operating means may be provided for automatically progressively increasing the effective length of adjustable vanes M as reel E rotates during arrestment of an aircraft. As shown in FIG. 3, bushing 40 may be provided on its exterior periphery with a sprocket 88 having teeth for driving a chain 90. Chain 90 is drivingly connected to a sprocket on shaft 92 of gear reduction mechanism 94. Gear reduction mechanism 94 has an output shaft 96 which includes a sprocket driving a chain 98. Chain 98 is drivingly engaged with a toothed sprocket 102 which is keyed to shaft P against rotational relative movement. During arrestment of an aircraft, reel E and hub J may rotate clockwise as viewed from the left in FIG. 3. The driving arrangement through chains 90 and 98 through gear reducer mechanism 94 will also drive shaft P clockwise. However, the driving arrangement of chains 90 and 98 with gear reducer 94 is arranged so that shaft P is rotated clockwise at a slightly slower rotational rate than hub J. Threads 46 and 48 may then be left-hand threads so that the difference in rotational speeds will cause shaft P to thread itself further to the right through bushing 40 as viewed in FIG. 3 during rotation of reel E. The progressive axial shifting of shaft P causes adjustable vanes M to have their effective length progressively increased during arrestment of an aircraft. It will be recognized that it is also possible to arrange driving chains 90 and 98 with a gear mechanism 94 so that shaft P will rotate slightly faster then hub J in order to thread itself further into bushing 40 and adjust adjustable vanes M.

In accordance with another arrangement, shaft P is replaced with shaft S in FIG. 4. Shaft S is similar to shaft P of FIG. 3 and cooperates with links and adjustable vanes M in the same manner except that instead of having threads 48, shaft S is slidably extended through a bushing 112 on bearings 114. Bushing 112 includes an exterior sprocket 116 driving chain 90, which in turn drives shaft 92 of gear reducer mechanism 94. Gear reducer 94 has an output shaft 96 on which a cam 118 is secured. Cam 118 acts against a rod 120 attached to piston 122 of hydraulic cylinder 124. A hydraulic line 126 connects the top end of cylinder 124 with the bottom end of hydraulic cylinder 128. Shaft S is provided with a piston 130 positioned within hydraulic cylinder 128. During arrestment of an aircraft, rotation of reel E causes rotation of bushing 112 which drives chain 90 to rotate shaft 92 of gear reducer 94. This in turn drives output shaft 96 of gear reducer 94 to rotate cam 118 which is contoured to progressively move piston 122 upward in cylinder 124 and progressively increase the pressure transmitted through hydraulic line 126. The progressive increase in pressure sent to cylinder 128 acts against piston 130 to shift piston 130 axially to the right as viewed in FIG. 4. This also shifts shaft S axially to the right through bushing 112 as viewed in FIG. 4. In this manner, adjustable vanes M are progressively adjusted to increase the braking force during arrestment of an aircraft.

In the preferred arrangement, the driving mechanism of FIG. 3 and the contour of cam 118 of FIG. 4 is arranged so that the braking force provided by energy absorber H remains substantially constant during arrestment of an aircraft even though the rotational velocity of reel E is slowing down. Therefore, the present invention provides an arrangement in which the effective length of adjustable vanes M is progressively increasing at a rate which is proportional to the deceleration rate of an aircraft being arrested. The effective length of adjustable vanes M is progressively increased to provide a substantially constant braking force to the reel over a major portion of an arrestment cycle.

In a preferred arrangement for the embodiment of FIG. 3, sprocket 102 is rotatably journaled in bearings mounted on supports 142 and 144. Sprocket 102 is keyed to shaft P by a longitudinal key which transmits torque from sprocket 102 to shaft P. The end portion of shaft P, to which sprocket 102 is keyed, is smooth and unthreaded so that the end portion of shaft P may move axially relative to sprocket 102. Therefore, axial threads 46 allows the end portion of shaft P to move axially relative movement of shaft P due to threading of threads 48 through threads 46 allows the end portion of shaft P to move axially relative to sprocket 102 which is held against axial movement by supports 142 and 144.

It will be recognized that the improved absorber of the present invention may have its rotor mounted for rotation on a vertical axis as well as a horizontal axis, and may cooperate with a payout reel mounted for rotation on a horizontal or vertical axis.

While the invention has been described with reference to certain preferred embodiments, it is obvious that modifications and alterations will occur to others upon the reading and understanding of this specification.

I claim:

1. A rotary hydraulic energy absorber including housing means for receiving liquid, said absorber having cooperating braking structures cooperating with liquid in said housing and with one another to provide retarding torque, said braking structures including rotor means having a plurality of vanes and stator means having pockets, the improvement comprising: mounting means mounting at least certain ones of said vanes for movement substantially radially outward and inward, and adjustment means for changing the radial length of said certain ones of said vanes to vary the retarding torque produced by said braking structures.

2. In an aircraft-arresting device including rotatable reel means having elongated payout means coiled thereon, said payout means being placed in tension and said reel being rotated to uncoil said payout means therefrom during arrestment of an aircraft, rotary hydraulic energy absorber means for retarding rotation of said reel means, said absorber including housing means for receiving liquid, said absorber having cooperating braking structures cooperating with liquid in said housing and with one another to provide retarding torque, said braking structures including rotor means having a plurality of vanes and stator means having pockets, the improvement comprising; mounting means mounting at least certain ones of said vanes for movement substantially radially outward and inward, and adjustment means for changing the radial length of said certain ones of said vanes to vary the retarding torque produced by said braking structures.

3. The device of claim 2 and including operating means for operating said adjustment means to progressively increase the effective length of at least certain ones of said vanes as said reel rotates during arrestment of an aircraft.

4. The device of claim 3 wherein said operating means is programmed for progressively increasing the effective length of said vanes at a rate proportional to the deceleration rate of an aircraft being arrested and the effective length of said vanes progressively increases to provide a substantially constant braking force to said reel over a major portion of an arrestment cycle.

5. The device of claim 3 wherein said operating means is operated by rotation of said reel means.

6. A rotary hydraulic energy absorber including housing means for receiving liquid, said absorber having cooperating braking structures cooperating with liquid in said housing and with one another to provide retarding torque, said braking structures including rotor means having a plurality of vanes and stator means having pockets, at least certain of said vanes being formed in at least two parts including a fixed vane part attached to said rotor and a movable vane part movably attached to said fixed vane part for movement substantially radially outward, and adjustment means for moving said movable vane part radially inward and outward to vary the retarding torque produced by said braking structures.

7. The absorber of claim 6 wherein said rotor includes hub and said adjustment means is mounted on said hub, said adjustment means including rod means mounted for axial movement inside said hub, and extensible elements attached to said rod and said movable vane part, said extensible elements being selectively movable outwardly and inwardly substantially radially of said hub upon axial movement of said rod means.

8. The absorber of claim 6 and including operating means for operating said adjustment means to progressively increase the effective length of at least certain ones of said vanes during rotation of said rotor.

9. A rotary fluid energy absorber including housing means for receiving fluid, said absorber having cooperating braking structures cooperating with fluid in said housing and with one another to provide retarding torque, said braking structures including rotor means having a plurality of vanes and stator means having pockets, adjustment means for changing the effective length of at least certain ones of said vanes to vary the retarding torque produced by said braking structures, and automatic operating means operable independently of interaction force between said braking structures and fluid in said housing for automatically operating said adjustment means to progressively increase the effective length of said certain ones of said vanes during rotation of said rotor.

10. The absorber of claim 9 wherein said operating means is responsive to rotation of said rotor and said rotor includes a hub, said adjustment means being mounted on said hub.

11. The absorber of claim 15 wherein said braking structure is for retarding movement of a moving mass, said operating means being programmed for progressively increasing the effective length of said certain ones of said vanes at a rate proportional to the deceleration rate of said mass to provide a substantially constant deceleration rate for said mass.